United States Patent [19]

Welch et al.

[11] Patent Number: 4,977,562
[45] Date of Patent: Dec. 11, 1990

[54] METHOD AND APPARATUS FOR LASER FREQUENCY STABILIZATION

[75] Inventors: Albert B. Welch, Dallas, Tex.; Marion W. Scott, Albuquerque, N. Mex.

[73] Assignee: LTV Aerospace and Defense Co., Dallas, Tex.

[21] Appl. No.: 425,366

[22] Filed: Oct. 19, 1989

Related U.S. Application Data

[63] Continuation of Ser. No. 102,352, Sep. 29, 1987, abandoned.

[51] Int. Cl.⁵ .............................................. H01S 3/13
[52] U.S. Cl. ................................... 372/32; 372/95; 372/98; 372/105; 372/106; 372/20; 372/21; 372/9; 372/92
[58] Field of Search ................... 372/21, 22, 95, 92, 372/98, 97, 33, 105, 106, 9, 10, 12, 20, 32

[56] References Cited

U.S. PATENT DOCUMENTS

| | | | |
|---|---|---|---|
| 3,205,370 | 9/1965 | Ashkin et al. | 372/32 |
| 3,243,724 | 3/1966 | Vuylsteke | 372/105 |
| 3,435,371 | 3/1969 | White | 372/106 |
| 3,527,520 | 9/1970 | Harris | 372/105 |
| 3,549,236 | 12/1970 | Mink | 372/98 |
| 3,626,317 | 12/1971 | Dakss | 372/105 |
| 3,719,414 | 3/1973 | Wentz | 372/105 |
| 3,740,663 | 6/1973 | Andringa | 372/106 |
| 3,872,402 | 3/1975 | Sanchez | 372/105 |
| 4,050,036 | 9/1977 | Chambers et al. | 372/95 |
| 4,233,572 | 11/1980 | Arthurs et al. | 372/105 |

FOREIGN PATENT DOCUMENTS

| | | | |
|---|---|---|---|
| 0505241 | 11/1976 | U.S.S.R. | 372/105 |
| 8400856 | 3/1984 | World Int. Prop. O. | 372/105 |

Primary Examiner—Leon Scott, Jr.
Attorney, Agent, or Firm—Arnold, White & Durkee

[57] ABSTRACT

A method and apparatus for stabilizing the frequency at which a laser cavity oscillates comprising a passive system which provides a plurality or continuum of optical paths of differing lengths. The various paths correspond to differences in mode parameters in the cavity, and involve compensating changes in polarization, beam direction, beam divergence, and the like, in exchange for a constant optical path length in the laser cavity. The unchanging optical path length results in a stable frequency of oscillation despite physical changes in the cavity which might otherwise alter that path length.

10 Claims, 1 Drawing Sheet

METHOD AND APPARATUS FOR LASER FREQUENCY STABILIZATION

This is a continuation of copending application Ser. No. 07 102,352 filed on Sept. 9, 1987 now abandoned.

FIELD OF THE INVENTION

This invention pertains to frequency stabilization of lasers and, more particularly, to a method and apparatus for passively controlling the frequency at which a laser oscillates by providing a plurality or continuum of optical path which correspond to continuously variable mode structure parameters such as beam direction, beam divergence or polarization. The optical paths are provided in exchange for alteration of the mode structure parameters without altering the "Q" of the resonator.

BACKGROUND OF THE INVENTION

Changes in the optical length of a laser resonator change the frequency of oscillation of the laser, which must be kept stable for coherent laser emission. Conventional single-mode lasers are subject to short-term frequency fluctuation caused by very small optical path length variations associated with plasma density fluctuations. Long-term frequency variations are caused by thermally-induced optical path length change and mechanically-induced vibration. A one-part-per-million change in the optical path length will produce a 28 MHz frequency shift in a $CO_2$ laser, for example. Hence, optical path length must be held to a few-tenths of a micrometer long-term and one thousand times less for short time intervals associated with the duration of a single transmission.

An electronically scanned laser (ESL) is subject to the above-mentioned problems and is further complicated by the effects induced by scanning the directional mode within the resonator optics. An optical path difference exists for mode direction shifts due to tiny imperfections in the optical elements. The resulting frequency shift can be considered long-term provided the beam position is constant during a measurement interval. Transient path length changes thermally induced by the intra-cavity laser beam will produce a short-term frequency "chirp" which is preferably kept exceedingly small.

The frequency at which a laser oscillates is determined broadly by the laser fluorescent line width and narrowly by the resonance of the optical cavity. Attempts to solve the problem of frequency fluctuation or to minimize its effect have ranged from heroic measures to control the physical length of the resonator to complex feedback systems.

Additionally, a phase conjugate reflector may be used at one end of the resonator to ensure that the reflective wave will match the phase of the wavefront leaving the opposite reflector; that is, the optical cavity will provide a high "Q" feedback at any frequency and the laser fluorescent line will be the sole determinant of the frequency of oscillation. The product of laser gain and reflectivity of the conjugate reflector must, however, be sufficient to maintain oscillation. Known schemes for meeting this requirement, such as high peak power four wave mixing, are generally complicated and inefficient.

SUMMARY OF THE INVENTION

The present invention incorporates a passive intracavity component that provides a plurality of optical path lengths in the resonator cavity which correspond to and compensate for variations in mode structure parameters such as beam direction, beam divergence or polarization and the plurality of paths provides a constant optical length in the resonator cavity which stabilizes the frequency of oscillation.

A laser resonating cavity according to the present invention will be stable in its frequency of oscillation and includes an active medium for generation of a substantially monochromatic optical signal and a passive frequency stabilizer for providing a plurality of optical paths in the resonator, said paths correlating to variations in mode parameters of the resonator.

In a preferred embodiment of the present invention, a biaxial crystal is mounted within the laser cavity to enable the optical field in the cavity to rotate its polarization and thereby maintain a constant optical path length within the laser. The crystal provides different optical path lengths to compensate for variations in the optical path length throughout the remainder of the laser cavity.

The biaxial crystal exhibits an internal conical refraction characteristic whereby the optical path through the crystal is dependent upon the direction of linear polarization of the incident light beam. As the frequency of oscillation of the laser tends to fluctuate in response to variations in the length of the resonator cavity, the direction of linear polarization of the light alters and, as the light becomes incident upon the biaxial crystal, its path through the crystal is altered. As a result, the biaxial crystal effectively holds the optical path length of the laser resonator constant although the physical length of the cavity may fluctuate due to thermal or mechanical stimuli. Accordingly, the laser will operate at the peak of its gain profile with a polarization that matches the resonator optical length to the gain profile peak, independent of the mechanical length of the resonator.

DETAILED DESCRIPTION OF A PREFERRED EMBODIMENT

Figure 1A:
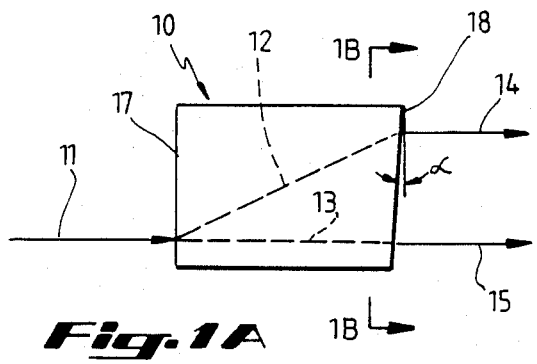
FIG. 1A is a side view of a biaxial crystal which may be used in one embodiment of the present invention.

FIG. 1A illustrates a biaxial crystal 10 in side view having incident beam 11, refracted beams 12 and 13, and resulting beams 14 and 15. While the incident beam 11 may have components of various linear polarization, the paths of the beams 12 and 13 through the crystal 10 will depend upon the polarization of the individual components. Of course, for a coherent incident beam of linear polarization, there will be but a single refracted beam 12 and resulting beam 14, its path being determined by its polarization direction.

Figure 1B:
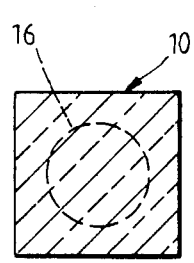
FIG. 1B is a section view of the biaxial crystal of FIG. 1A taken along the section lines B—B of FIG. 1A.

FIG. 1B shows the same crystal 10 in section and shows the locus 16 of possible positions of refracted beams 12 and 13. The locus 16 of possible positions circumscribes a circle, the positions about the circumference of the circle corresponding to the various possible directions of linear polarization of the incident beam 11 shown in FIG. 1A.

Considering FIGS. 1A and 1B together, it will be seen that the collection of all possible paths of refracted beams 12 and 13 through the biaxial crystal 10 comprises a cone and the crystal 10 is said to exhibit an internal conical refraction characteristic which depends upon the direction of linear polarization of the incident beam 11. Referring to FIG. 1A, the locus of all possible positions of resulting beams 14 and 15 comprises a hollow cylinder.

If the faces 17 and 18 of the crystal 10 are parallel to one another and are perpendicular to an optic axis of the crystal, and the input beam 11 is oriented parallel to the optic axis, then the optical path length is identical for all refracted beams 12 and 13, regardless of their polarization. Although the beams 12 and 13 clearly traverse different physical lengths, the index of refraction seen by each beam adjusts itself so that the optical path length is the same.

Different optical path lengths corresponding to the different directions of polarization may be provided by having the biaxial crystal made with a slight wedge between the two crystal faces. As illustrated in FIG. 1A, face 17 may be perpendicular to an optic axis of the crystal 10 while the face 18 is tilted at a slight angle $\alpha$ to the perpendicular. An angle $\alpha$ of approximately 0°20' will cause the desired varieties of optical path lengths. As will be seen below, the different optical path lengths may be used to offset or compensate for variations in optical path length in the remaining portion of the laser cavity.

Figure 2:
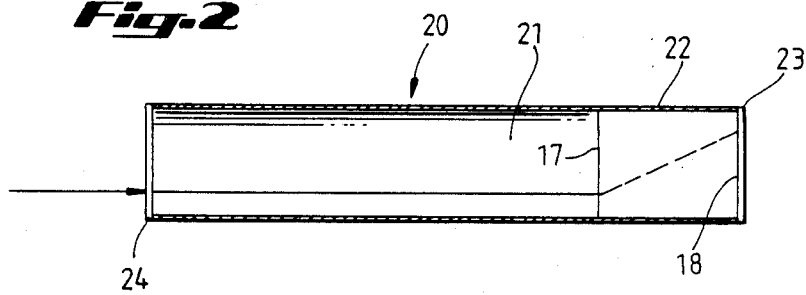
FIG. 2 shows a laser cavity employing a biaxial crystal for frequency stabilization.

Referring now to FIG. 2, a laser cavity 20 utilizing the present invention is shown having a lasing medium 21 and a passive frequency stabilizer 22. The laser cavity 20 and lasing medium 21 are well known in the art. The pertinent relationships of frequency-determining parameters are discussed in *Introduction to Optical Electronics*, by Amnon Yariv; Holt, Rinehart & Winston: New York, 2d Ed., 1976 Section 6.2.

In general, one may speak of longitudinal modes and transverse or directional modes in the resonator volume. Each frequency for which the round trip path in the resonator is an even number of wavelengths is a longitudinal mode. In a scanlaser comprising a flat field conjugate resonator, the path lengths are nominally the same for all of the beam directions and one would say that the transverse modes are degenerate, meaning that they all resonate at the same frequencies. The most general condition defining an eigenmode in a resonator is that the wavefront reproduces itself after one round trip (see Section 4.5 of *Introduction to Optical Electronics*, by Amnon Yariv, 2d Ed. 1976, referenced above). Hence the geometric description of the volume occupied by an oscillating mode is not necessarily a right cylinder as in a Fabry-Perot resonator but, rather, may be a necked-down volume of radial symmetry as in a confocal resonator. Alternatively, the mode may occupy a volume which is a hollow cylinder or it may have a transverse phase distribution that yields an annulus in the Fourier transform plane. For each eigenmode there is one other mode parameter, namely polarization of the radiation. This polarization mode parameter is allowed to vary in the preferred embodiment of the present invention to provide passive frequency stabilization.

Referring again to FIG. 2, an active lasing medium 21 and a biaxial crystal 22 combine to form the lasing cavity 20 between end reflectors 23 and 24. In one embodiment, the active medium 21 comprises a helium-neon (HeNe) gas and the biaxial crystal 22 is a lithium formate crystal. In general, any lasing medium (i.e., any frequency of oscillation) will be acceptable and the crystal may be any material which is substantially transparent, that is, exhibits low optical loss, at the frequency of operation and which exhibits significant biaxial qualities. The crystal 22 is formed with a slight wedge of about 0°20' between its two end faces 17 and 18 and may be attached to the lasing medium using any technique which has been used to attach reflectors to lasing media. Also, the crystal 22 should be oriented with respect to the lasing medium 21 such that an optic axis of the crystal 22 is aligned with the longitudinal axis of the lasing medium 21.

As the active medium 21 reacts to the excitation to emit spontaneous electromagnetic radiation, that radiation of various polarization components travels the length of the active medium 21, through the biaxial crystal 22 and is reflected by the reflector 23. The radiation then is reflected back through the biaxial crystal 22 and through the active medium 21 to the partially reflecting device 24 which is the output coupler. The frequency components of the radiation that traverse a round trip path equal to an integer number of wavelengths for the peak of the laser gain profile resonate and build up an oscillation while other frequency components are suppressed.

As stated above, the laser cavity 20 will be frequency-stable so long as the optical path length within the cavity remains constant. However, in the absence of frequency stabilization, as the optical path length fluctuates, the wavelength of the emitted radiation will attempt to compensate, producing frequency pulling and causing fluctuations in the frequency. The biaxial crystal 22 provides the medium in the lasing cavity 20 to stabilize the optical path length when it might otherwise vary in response to various stimuli.

As the physical length of the lasing cavity fluctuates because of heating during the lasing activity, the optical path length within the cavity 20 tends to follow the physical length. Because the biaxial crystal 22 can compensate for optical path length variations in the active medium 21, the lasing cavity 20 will remain frequency-stable despite changes in physical length of the lasing cavity 20. The tendency of the lasing cavity 20 to remain frequency-stable will cause the emitted radiation to alter its linear polarization such that a new optical path through the biaxial crystal 22 is utilized. For example, as the active medium 21 lengthens in response to heating, its optical path length tends to lengthen. The emitted radiation will alter its direction of linear polarization so as to follow a shorter optical path through the crystal 22. The shortening of the optical path through the crystal 22 will offset or compensate for the lengthening of the optical path through the active medium 21 so that the optical path length of the overall resonator 20 remains constant.

Thus the biaxial crystal 22 provides the mechanism which the lasing cavity 20 needs to remain frequency-stable in the face of stimuli which would otherwise vary the optical length of the cavity and the resulting frequency of the emitted radiation. This passive mechanism is very rapid and much preferred to the known active devices because active feedback and separate reference standards are not needed. Further, the biaxial crystal 22 provides a simple and automatic frequency stabilizing mechanism. The amount of rotation of the polarization vector can be kept sufficiently small as to have a negligible effect on mixing efficiency in heterodyne applications.

Figure 3A:
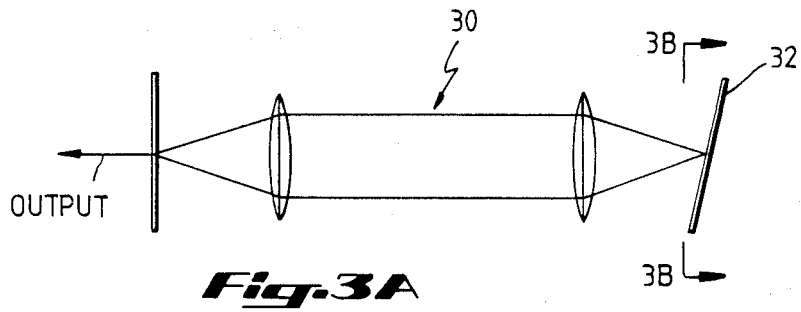
FIG. 3A shows a laser cavity utilizing a tilted reflector at one end to stabilize the frequency of oscillation in a scan laser.
Figure 3B:
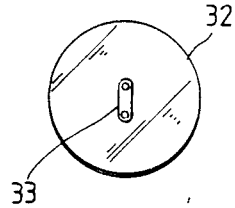
FIG. 3B is an end view of the tilted reflector, showing the elongated reflecting spot.

As is illustrated in FIG. 3A, another embodiment of the present invention utilizing a passive frequency stabilizer in conjunction with the lasing cavity includes use of a tilted reflector 32 at one end of the lasing cavity to produce a continuously changing optical path as the direction of the electromagnetic beam varies. The degree of tilt of reflector 32 is exaggerated in FIG. 3A for purposes of illustration only as in practice the angle will be minute. Whereas the biaxial crystal in the previous embodiment trades linear polarization direction for frequency stability, the tilted reflector 32 trades beam direction for frequency stability. Such an embodiment may have application, for example, in a scan laser where the optical path length normally varies with the scan angle. As shown in FIG. 3B, the reflecting spot 33 on the control reflector 32 will be elongated in the direction of changing path. Because the laser medium is homogeneously broadened, oscillation will occur at a frequency corresponding with the peak of the fluorescent line and in a direction corresponding with an optical length in perfect resonance. Oscillation is precluded for any other combination of frequency and direction because the laser gain is suppressed below threshold for all other combinations.

Figure 4A:
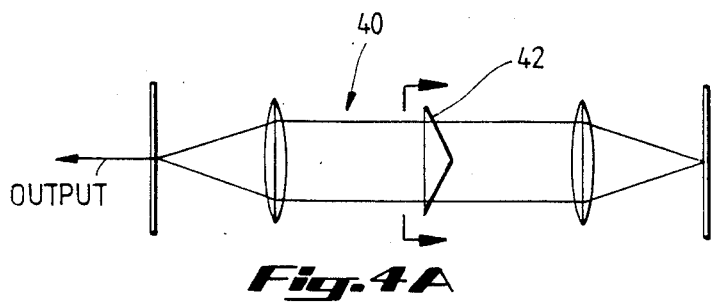
FIG. 4A shows a laser cavity having an axicon to stabilize the frequency in a scan laser.
Figure 4B:
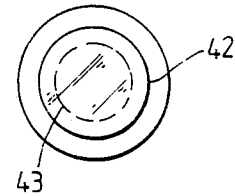
FIG. 4B is an end view of the axicon, showing the cross-section of the cylinder of rays.

Illustrated in FIG. 4A is yet another embodiment of the present invention which includes a weak axicon 42 in the center of a scan laser cavity 40, the axicon 42 being the nodal point for all of the beam directions. An axicon is a refracting element with a conical shape which brings rays at increasing radii to focus at an increasing distance along the axis. The difference in optical path length for radiation passing through the center of the axicon as compared to radiation passing through an edge of the axicon will generally be one-half wavelength, this path difference corresponding to the frequency difference between successive resonant frequencies of the resonator. Hence, for any frequency there is a circular family of ray paths 43 to provide resonant feedback and sustain oscillation. This circular family of ray paths is shown in FIG. 4B. At the nominal resonator length, the annulus 43 of rays in resonance with the peak of the laser gain profile is centered halfway between the center and edge of the axicon. If the mechanical length of the resonator decreases by one-tenth wavelength, the radius of the annulus of rays supporting oscillation will increase by 20% of the axicon radius and the far field divergence will decrease by 20%. Oscillation at a lower frequency and/or frequency pulling can occur due to the high gain for the family of rays inside the annulus, unless the gain is suppressed either by transverse flow of the excited gas or by choosing a control mirror reflecting spot size that is small enough to diffract a substantial amount of power from the annular mode into the competing mode space It will now be understood by those skilled in the art that a frequency-stable laser resonator has been shown to include a laser medium for generating a substantially monochromatic optical signal and a passive frequency stabilizer for providing a plurality or continuum of optical paths in the resonator, the paths corresponding to continuously variable mode parameters of the resonator. It will be appreciated that variations in the embodiments described may be developed without departing from the present invention as defined in the appended claims.

What is claimed is:

1. A frequency-stable laser resonator, comprising:
   a resonant lasing cavity;
   an excitor for generating a substantially monochromatic electromagnetic signal in said cavity; and
   a passive frequency stabilizer providing a continuum of differing optical path lengths in exchange for variation in a variable mode parameter, said variable mode parameter being selected from the group consisting of beam direction, direction of linear polarization, and annular wavefront radius,
   wherein the signal follows an optical path that varies along the continuum of optical path lengths together with variation in the variable mode parameter such that said signal has a frequency of oscillation that is substantially determined by a peak of a fluorescence profile and the frequency of oscillation is substantially unaffected by variation in the variable mode parameter,
   thereby producing a frequency-stable resonator.

2. The laser resonator of claim 1, wherein said passive frequency stabilizer comprises a biaxial crystal.

3. The laser resonator of claim 2, wherein said biaxial crystal has opposing end faces generally perpendicular to an optic axis of said crystal, said end faces forming a wedge angle therebetween, said optic axis of said crystal being generally parallel to a direction of propagation of the electromagnetic signal through said lasing cavity.

4. The laser resonator of claim 1, wherein said passive frequency stabilizer comprises a conically shaped refracting element.

5. The laser resonator of claim 4, wherein said refracting element comprises an axicon positioned along a longitudinal axis of said resonator, an optic axis of said axicon being parallel to the longitudinal axis of the resonator.

6. The laser resonator of claim 1, wherein said passive frequency stabilizer comprises a reflector at an end of said resonator, a surface of said reflector being tilted with respect to a perpendicular to a longitudinal axis of said resonant cavity.

7. A laser for generating a frequency-stable output, comprising:
   a lasing medium and excitor for generating a coherent electromagnetic signal having a frequency of oscillation and a direction of linear polarization, said medium having a longitudinal axis along which said signal propagates;
   a coupler coupling said signal out of said lasing medium; and
   an optical device adjacent said lasing medium, said optical device having an optic axis generally parallel to said longitudinal axis of said lasing medium and having end faces generally perpendicular to said optic axis, said end faces forming a wedge angle therebetween, wherein said signal follows an optical path through said optical device which has a one-to-one correspondence to the direction of linear polarization of said signal, and wherein the wedge angle yields a maximum round-trip optical path length change of one wavelength through said optical device with variation in the direction of linear polarization of said electromagnetic signal, said optical device, lasing medium and coupler forming a laser resonator for providing a laser output, said optical device providing a continuum of differing optical path lengths of substantially equal loss to provide a frequency-stable laser output in exchange for variation in the direction of linear polarization of said signal in said resonator, the frequency of oscillation of said signal being substantially unaffected by variation of a resonator physical length.

8. The laser of claim 7, wherein said lasing medium comprises a helium-neon gas mixture and wherein said optical device comprises a lithium formate crystal.

9. A method for stabilizing the frequency at which a laser resonator oscillates, comprising the steps of:
generating a substantially monochromatic electromagnetic signal in the resonator; and
providing a continuum of differing optical path lengths in exchange for variation in a variable mode parameter, said variable mode parameter being selected from the group consisting of beam direction, direction of linear polarization, and annular wavefront radius, wherein the signal follows an optical path that varies along the continuum of optical path lengths together with variation in the variable mode parameter such that the signal has a frequency of oscillation that is substantially determined by a peak of a fluorescence profile and the frequency of oscillation is substantially unaffected by variation in the variable mode parameter, thereby stabilizing the frequency at which the laser resonator oscillates.

10. In a laser resonator having a lasing medium, a method for stabilizing the frequency at which the laser resonator oscillates, comprising the steps of:
generating an electromagnetic signal in the lasing medium, said signal having a frequency of oscillation and a direction of linear polarization;
passing said signal through a biaxial crystal in a direction generally parallel to an optical axis of said crystal, said crystal having end faces that form a wedge angle therebetween, wherein said wedge angle yields a maximum round-trip optical path length change of one wavelength through said crystal with variation in the direction of linear polarization of said electromagnetic signal; and
providing a continuum of optical path lengths through said crystal of substantially equal loss to provide a frequency-stable laser output in exchange for variation in the direction of linear polarization of said signal in said resonator, the frequency of oscillation of said signal being substantially unaffected by variation of a resonator physical length.

* * * * *